United States Patent [19]

Boenning et al.

[11] Patent Number: 4,584,436
[45] Date of Patent: Apr. 22, 1986

[54] DOOR-MOUNTED COMBINATION INTERCOM AND VIEWER

[75] Inventors: Charles B. Boenning; Charles J. Moorman, both of Cincinnati, Ohio

[73] Assignee: Claiborne Electronics, Inc., Cincinnati, Ohio

[21] Appl. No.: 604,477

[22] Filed: Apr. 27, 1984

[51] Int. Cl.⁴ .................................... H04M 9/00
[52] U.S. Cl. .................................... 179/37
[58] Field of Search ............... 179/37, 100 L, 179; 381/83, 88, 90, 91, 93; D14/92; 350/243; 181/151

[56] References Cited

U.S. PATENT DOCUMENTS

| | | | |
|---|---|---|---|
| 1,890,742 | 12/1932 | Messmer | 381/83 |
| 2,169,874 | 8/1939 | Hardt . | |
| 2,262,203 | 11/1941 | Redstone et al. . | |
| 2,281,608 | 5/1942 | Vincent . | |
| 2,341,539 | 2/1944 | Giannini | 179/179 |
| 3,404,234 | 10/1968 | Batt et al. . | |
| 3,482,037 | 12/1969 | Brown et al. . | |
| 3,935,994 | 2/1976 | Darvishian . | |
| 4,049,911 | 9/1977 | Schlaff et al. . | |
| 4,116,529 | 9/1978 | Yamaguchi . | |
| 4,130,728 | 12/1978 | Gramel . | |
| 4,178,488 | 12/1979 | Nishihata | 179/179 X |
| 4,273,956 | 6/1981 | Wolfe . | |
| 4,281,738 | 8/1981 | Jackson | 181/151 |
| 4,410,770 | 10/1983 | Hagey | 181/151 |

Primary Examiner—Keith E. George
Attorney, Agent, or Firm—Wood, Herron & Evans

[57] ABSTRACT

An improved door-mounted combination intercom and viewer is provided including a pair of identical housings, each having a microphone and a speaker therein. The microphones are isolated from contact with the housings by a vibration damping material to prevent feedback.

13 Claims, 5 Drawing Figures

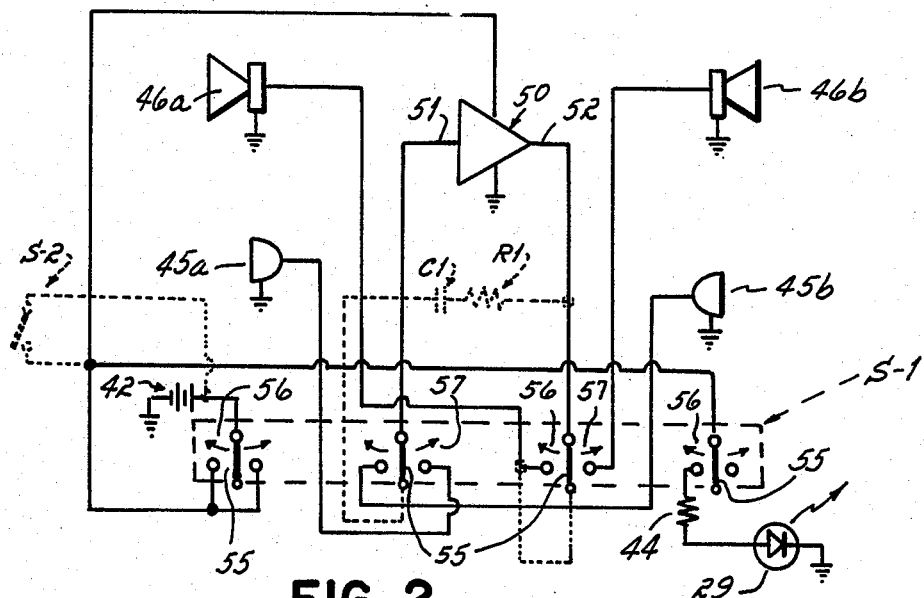
FIG. 2
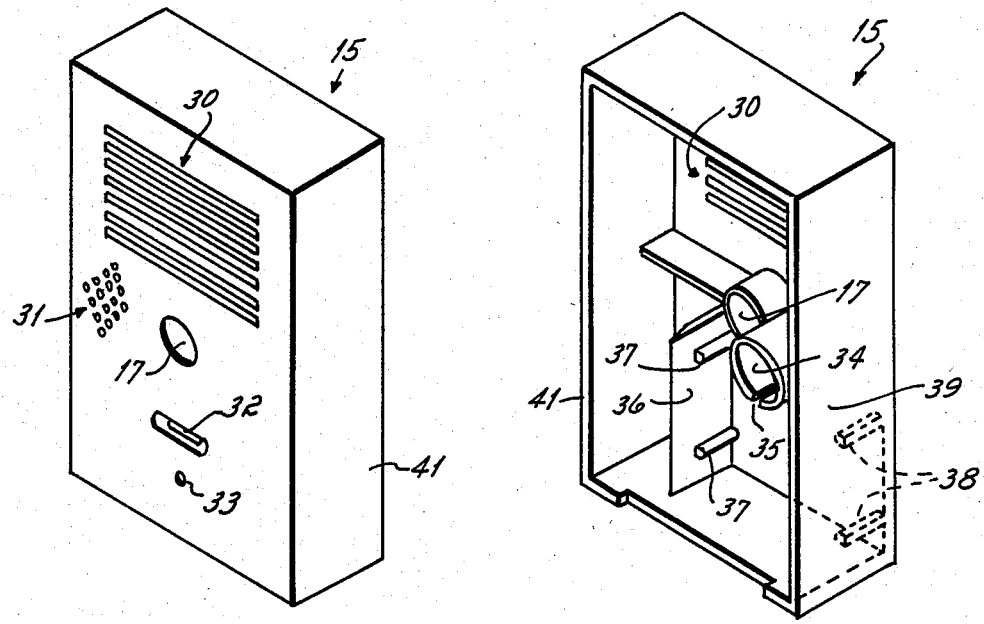
FIG. 3    FIG. 4
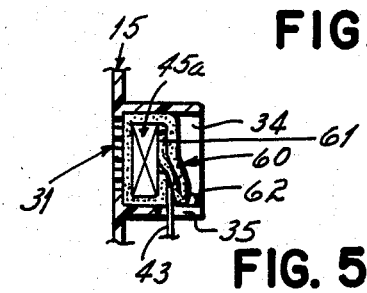
FIG. 5

DOOR-MOUNTED COMBINATION INTERCOM AND VIEWER

BACKGROUND OF THE INVENTION

This invention relates to combination intercom/viewing devices for entrances to homes or apartments, and more particularly to devices of this type which are mounted directly to the door to facilitate communication with and visual observation of visitors without opening the door.

By way of background, a typical through-the-door intercom/observation system of the type with which this invention is concerned, includes an elongated viewing tube which is inserted through an aperture in the door as well as through a pair of housings overlying the door aperture at opposite sides thereof. The housings can be either bolted or otherwise secured on opposite sides of the door. For example, threaded elements may be provided at each end of the tube, with the threaded elements being flared such that when they are screwed into the tube the housings are secured in sandwich relation to the door.

Visual observation of visitors by the owner is accomplished without opening the door merely by looking through the tube. To achieve the intercom function and thereby establish audio communication without opening the door, each of the housings is typically provided with a microphone and a speaker, or a combination microphone/speaker element. The electronic circuitry necessary to amplify and receive the audio signals is mounted in one or the other of the housings. Such audio circuitry is generally a simple operational amplifier, and includes a switch which connects a microphone on one side of the door to the input of the amplifier and the output thereof to the speaker on the other side of the door, or vice versa.

A serious problem arises with combined visual/intercom devices of the foregoing type due to the fact that because the housings are bolted together, the speaker in one housing and the microphone in the other housing are spaced apart only a few inches, creating a short acoustic feedback loop. As a consequence, during operation of the intercom, there is a tendency for vibrations to be transmitted directly through the housing and the door from one speaker to the other microphone (and vice versa), thereby creating acoustic feedback. When that occurs, the natural tendency is for the amplifier to "run away" and produce a loud, high-pitched squeal on the speaker. That squeal is irritating and during amplifier runaway, little, if any, audio communication can actually take place.

SUMMARY OF THE INVENTION

Accordingly, the principle objective of the invention has been to provide a door-mounted combined visual observation and intercom system of the type described that minimizes acoustic feedback. This objective has been accomplished by providing an intercom system of the type described wherein the microphones are each encapsulated within their respective housings in a vibration damping material so that the microphones do not physically contact the housing. By encapsulating the microphones in the manner indicated, the microphones on each side of the door are acoustically isolated from the speakers on the other side, minimizing acoustic feedback.

In a preferred form of the invention, the housings are both molded of synthetic resin into the same identical shape. As a consequence only a single mold is required. Additionally, the housings are interchangeable, reducing inventory requirements.

To enhance serviceability and minimize tampering, in the preferred form of the invention, the tube and the outside housing are secured to the door while the audio circuitry and battery are mounted within the inside housing which is removable for servicing without removing or loosening the outside housing.

BRIEF DESCRIPTION OF THE DRAWINGS

These and other features and objectives of the invention will become apparent from a detailed description of the invention taken in conjunction with the drawings in which:

FIG. 2 is a simplified schematic diagram of the circuit employed in the present invention;

FIG. 3 is a front perspective view of the housing employed in the invention;

FIG. 4 is a rear perspective view of the housing of FIG. 3;

FIG. 5 is a cross-sectional view through the microphone tube showing the encapsulation of the microphone and the vibration-damping material.

DETAILED DESCRIPTION OF THE DRAWINGS

Figure 1:
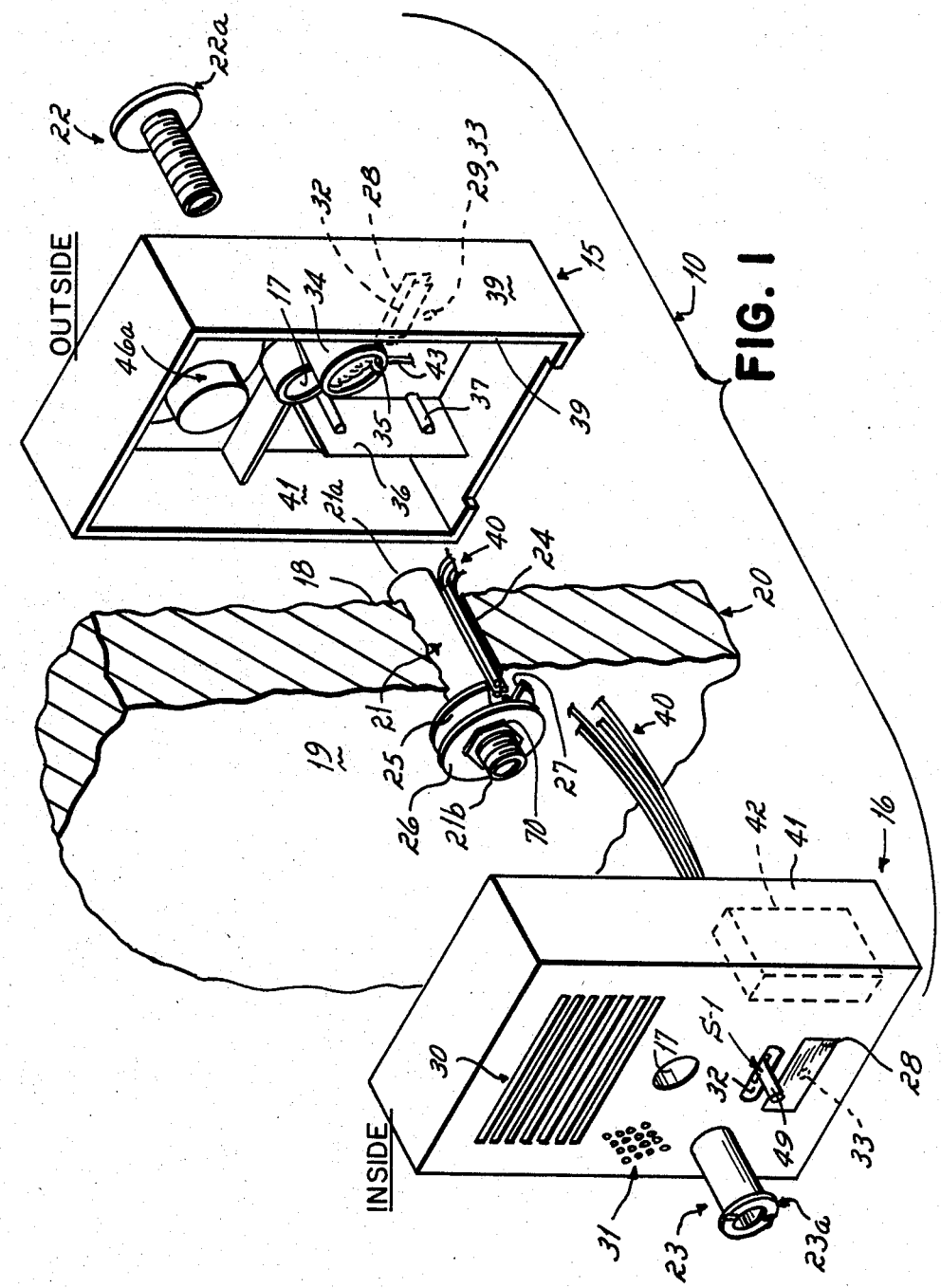
FIG. 1 is an exploded perspective view of the present invention as applied to a door.

The intercom system 10 of the present invention includes a pair of housings 15 and 16 which are adapted to engage tl sides 18 and 19, respectively, of a door 20. A viewing .be, comprised of a brass extension or tube 21, an exte1 or lens piece 22 having a flared outer end 22a, and an interior brass tube 23, is positioned within the aperture 24 in door 20. Tube 21 has a female threaded end 21a into which the male threads of lens piece 22 are received and a male threaded end 21b into which the female threaded tube 23 having a flared outer end 23a is received. Housings 15 and 16 include apertures 17 through which exterior lens 22 and interior brass tube 23 project to engage the thread ends 21a, 21b of brass extension 21.

To attach housing 15 to the door side 18, for example, brass extension 21 is slid through aperture 24. The wires 40, whose function will be discussed hereafter, are also fitted within aperture 24. Thereafter, housing 15 is placed against the side of door 20 such that extension 21 is in line with aperture 17. Exterior lens 22 is then fitted through aperture 17 where it is threadably received in brass extension 21. Brass extension 21 and exterior lens 22 are screwed together until a firm grasp (due to the flare 22a about the lens) is maintained on housing 15 whereby it is held securely against door 20.

Extension 21 is provided with two nylon washers 25 and 26 which are secured in place on the outer threaded end 21b of tube 21 with a nut 70. Nut 70 may be threadably received on end 21b or, preferably, is integrally formed on the tube 21. Nylon washer 25 is grooved as at 27 to permit passage of wires 40. Nylon washers 25 and 26 cooperate with nut 70 to act as a restraining means on the interior door side of brass extension 21 which is on side 19 of door 20 to help maintain housing 15 in secure engagement with door 20 when housing 16 is not attached.

Housing 16 is attached to door 20 in a fashion similar to the attachment of housing 15 on the other side of door 20. More particularly, housing 16 is attached by sliding aperture 17 of housing 16 over threaded end 21b of tube 21 and screwing tube 23, with its flared end 23a outboard, onto tube end 21b. As will be appreciated from the foregoing, interior brass tube 23 could be unscrewed from brass extension 21, and housing 16 removed from engagement with door 20 to replace the battery 42, for example, without allowing housing 15 to dislodge from the other side of door 20.

With reference to FIGS. 3 and 4, there is shown the housing 15 which is preferably molded of synthetic resin and includes air vents 30 and 31 to permit passage of air waves between the exterior and the interior of housing 15. In addition to the aforementioned aperture 17, housing 15 includes a switch aperture 32 and an aperture 33 for a light-emitting diode (LED) to be described hereafter. Behind air vent 31 is a microphone tube 34 into which a microphone 45a is inserted (see FIG. 1). Behind air vents 30 is mounted a speaker 46a (see FIG. 1) by known means such as glue. The interior of housing 15, as seen in FIG. 4, also includes vertical partition 36 which includes a pair of upstanding column or pillar supports 37 on one side thereof. There are mating supports 38 spaced opposite supports 37 on the right wall 39 of housing 15. Partition 36 cooperates with left wall 41 to provide a battery chamber into which a standard 9-volt carbon zinc or alkaline battery 42 is placed. Supports 37 and 38 provide a support upon which a printed circuit board (not shown) rests. The printed circuit board (not shown) contains the circuitry (FIG. 2) to operate intercom 10 and is sized to fit snugly within the space defined by partition 36 and wall 39 while resting on supports 37, 38. Once in place, the board (not shown) is secured by known means such as glue.

To facilitate passage of microphone wire 43 from microphone 45a through microphone tube 34 and into engagement with the printed circuit board (not shown), tube 34 is preferably provided with a slot 35 which extends just slightly below the plane defined by the top of supports 37 and 38. The four wires 40 provide electrical inner-connection between the microphone 45a, speaker 46a, and LED 29 in housing 15 to the circuitry (see FIG. 2) contained on the printed circuit board (not shown) in housing 16. Typically, housing 16 is on the interior side 19 of door 20.

The housing 16 preferably is identical to the housing 15 as shown in FIGS. 3 and 4.

For reasons to become more apparent hereafter, housing 15 will normally include a nameplate 28 covering up switch aperture 32, and an LED 29 projecting through LED aperture 33. Conversely, housing 16 will employ a nameplate 28 to cover up LED aperture 33, and will have a switch lever 49 extending through switch aperture 32.

With reference to FIG. 2, there is shown a simplified schematic diagram of a preferred two-way communications circuit including two microphones 45a and 45b, two speakers 46a and 46b, and LED 29. Microphone 45a and speaker 46a are mounted in one housing while microphone 45b and speaker 46b are mounted in the other housing. Amplifier 50 is the main active electronic component of the preferred embodiment of the invention. Construction techniques for amplifier 50 are well-known to those of ordinary skill in the art and need not be repeated here.

Amplifier 50 has an input 51 which is selectively coupled via switching to be described either to microphone 45a or to microphone 45b during operation of intercom 10. Amplifier 50 also has an output 52 which is similarly coupled to speaker 46b or 46a. When microphone 45a is coupled to input 51, output 52 is coupled to speaker 46b, whereas when microphone 45b is coupled to input 51, output 52 is coupled to speaker 46a. The determination of what microphone-amplifier-speaker circuit is maintained is determined by the position of the four mechanically and physically interconnected wiper arms 55 of switch S-1.

Switch S-1 is preferably a 4P3T switch which, in the first position shown, does not couple input 51 to either microphone 45a or 45b nor output 52 to either speaker 46a or 46b. However, arms 55 of switch S-1 can be moved to a second position as indicated by arrow 56 whereupon microphone 45b is coupled to input 51 and speaker 46a is coupled to output 52. Wiper arm 55 of switch S-1 could also be moved to a third position as shown by arrow 57 in which case microphone 45a is coupled to input 51 and output 52 is coupled to speaker 46b. As will be appreciated, switch S-1 also has a first, power-off position such that when wiper arm 55 is in the first position, the battery 42 is not providing energy to any of the circuitry of FIG. 2. However, when switch S-1 is moved to the second or third position, the battery 42 is providing energy for the amplifier 50. Also, because second position of switch S-1 indicates that the person standing outside the door is to talk, indicator LED 29 is provided on the outer housing 15 to indicate that the person outside can go ahead and talk. Hence, when switch S-1 is in the second position, the battery also supplies power to indicator LED 29 via resistor 44.

Of special concern in operation of system 10 is feedback. Because speaker 46a (or 46b) will typically be three to five inches away from microphone 45b (or 45a, respectively), feedback can become a significant problem. It was discovered that several paths for feedback were available in the environment into which this invention is intended to be used. The most notable path for feedback is vibration through housings 15 and 16 and door 20, but other paths exist such as through aperture 24. Hence it became necessary to acoustically isolate microphones 45a and 45b from their respective mating speakers 46a and 46b in such a way that vibration from the energized speakers could not reach the energized microphone. One requirement was to prevent physical contact of the microphone with the housing. A second requirement was to provide some acoustic isolation from the microphone's mating speaker so that feedback through aperture 24 was not a problem. Suspending the microphone within the housing 15 would be unsatisfactory because of the aforementioned feedback through aperture 24.

It was discovered that the microphone could be encapsulated in a vibration-damping material to prevent direct physical contact with the housing while still permitting airwaves to reach the microphone. However, to obviate the effects of aperture 24, it became necessary to encapsulate the microphone so that an additional barrier was created between the microphone and its associated speaker. However, a thick encapsulation would be unsatisfactory because it would also block the air waves through vent 31 and thus would not permit communication to occur. It was discovered that by wrapping the microphone in a single strip of low-density foam, with at least a double thickness behind the microphone, satisfactory operation of the intercom could be obtained while eliminating or preventing feedback. Preferably, the foam is of a density of approximately three to four pounds per cubic foot and the strip of foam is 3/16 to ¼ inch thick. With reference to FIG. 5, it can be seen that a strip of foam 60 is wrapped around microphone 45a with its end 61 wrapped under itself so that when the combination of microphone 45a and foam 60 are inserted into tube extension 34, foam strip 60 does not have a loose edge with a tendency merely to pop out of the tube extension 34. Once in place a dab of glue 62 may be applied to keep microphone 45a and foam 60 seated securely within tube extension 34. Foam strip 60 substantially encapsulates microphone 45a and prevents vibrational feedback, but due to its low density permits air waves to pass through vent 31 and reach microphone 45a. Further, because of the doubling effect achieved by folding over end 61, the feedback path through aperture 24 is minimized. Microphone 45b is similarly encapsulated.

In the preferred form, battery 42 and the audio circuit shown in FIG. 2 are contained within housing 16 which is typically mounted on the inside of the apartment. Thus, the system is easily serviced from the inside while minimizing vandalism. Further, housing 15, on the outside, is secured to door 20 by lens 22 and nut 70 such that housing 16 may be removed for servicing, such as changing the battery, without removing or loosening housing 15. Thus, tube 21 and housing 15 are secured to the door while housing 16 is removably secured to tube 21.

As an alternative, microphone 45a and speaker 46a could be combined into a single microphone/speaker. Microphone 45b and speaker 46b could be similarly combined. Amplifier 50 would typically need to be supplied with an impedence matching transformer but would otherwise be operable in my invention. What is important to recognize however is that the feedback isolation technique employed herein must still be used to avoid feedback. In a preferred form, the isolation technique of this invention would preferably be implemented by wrapping each combined microphone/speaker in foam in a manner similar to the manner that the microphones 45a and 45b, discussed in connection with the embodiment of FIG. 2, are wrapped.

As a further alternative, LED 29 and resistor 44 could be replaced by switch S-2 (mounted to housing 15 in place of LED 29), resistor R1 and capacitor C1. Switch S-2, resistor R1 and capacitor C1 are shown in dotted line in FIG. 2. Resistor R1 is coupled to output 52 of amplifier 50 and capacitor C1 is coupled to resistor R1. When capacitor C1 is further coupled to input 51 of amplifier 50 (when switch S-1 is in the first position shown), an RC feedback network is formed across amplifier 50 causing amplifier 50 to become an oscillator when energized. Speaker 46a is now coupled to output 52 in switch S-1's first position. Closing switch S-2 (it is shown open) provides power from battery 44 to energize amplifier 50. Speaker 46a buzzes at a frequency determined by the value of R1 and C1, as is well understood in the art. Amplifier 50, switch S-2, speaker 46a, resistor R1 and capacitor C1 thus cooperate to provide an enunciator/buzzer.

We claim:

1. An improved combination intercom and viewer system for a door having an aperture therein, comprising:

a pair of housings for engagement with respective sides of a door, each said housing having an aperture therein;

a speaker and a microphone mounted in each said housing;

a viewing tube insertable through said aperture in said door, said tube having opposite ends extending beyond said door sides and extending through said apertures in said housings;

a two-way communication circuit mounted in one of said housings, said microphones and said speakers being selectively electrically connected to said two-way communications circuit, said circuit including first switch means for selectively establishing communication between said microphone in a preselected one of said housings and said speaker in the other of said housings;

vibration damping material for isolating each said microphone from physical contact with its respective housing to prevent acoustic feedback caused by vibration, said two-way communication circuit further including a battery mounted in said same housing, said communication-circuit-containing-housing being an inside housing, the other said housing being an outside housing, first means cooperating with one of said tube ends for securing said outside housing to said door and second means for removably securing said inside housing to another of said tube ends whereby said inside housing is removable for servicing without removing or loosening said outside housing.

2. The intercom and viewer system of claim 1, said communication circuit including an energizable oscillator circuit and further including a second switch means mounted in said outside housing for selectively energizing said oscillator circuit and coupling said oscillator circuit to said inside housing speaker whereby said switch means, said oscillator circuit, and said inside speaker cooperate to provide an enunciator/buzzer.

3. The intercom and viewer system of claim 2 wherein said vibration damping material is foam having a density in the approximate range of 3-4 lbs. per cubic foot.

4. The intercom and viewer system of claim 3 wherein each of said microphones is substantially enclosed by a strip of said foam wrapped about said microphone, wherein said strip has a thickness in the approximate range of 3/16-¼ inch.

5. The intercom and viewer system of claim 4 wherein said strip is folded over behind each of said microphones to provide double said thickness therebehind to minimize acoustic feedback.

6. The intercom and viewer system of claim 1 wherein said vibration damping material is foam having a density in the approximate range of 3-4 pounds per cubic foot.

7. The intercom and viewer system of claim 6 wherein each of said microphones is substantially enclosed by a strip of said foam wrapped about said microphone, wherein said strip has a thickness in the approximate range of 3/16-¼ inch.

8. The intercom and viewer system of claim 7 wherein said strip is folded over behind each of said microphones to provide double said thickness therebehind to minimize acoustic feedback.

9. The intercom and viewer system of claim 1 wherein said pair of housings are substantially identical in structure.

10. The intercom and viewer system of claim 9, said communication circuit including an energizable oscillator circuit and further including a second switch means mounted in said outside housing for selectively energizing said oscillator circuit and coupling said oscillator circuit to said inside housing speaker whereby said switch means, said oscillator circuit, and said inside speaker cooperate to provide an enunciator/buzzer.

11. The intercom and viewer system of claim 9 wherein said vibration damping material is foam having a density in the approximate range of 3-4 pounds per cubic foot.

12. The intercom and viewer of claim 11, wherein each of said microphones is substantially enclosed by a strip of foam wrapped about said microphone, wherein said strip has a thickness in the approximate range of 3/16-¼ inch.

13. The intercom and viewer of claim 12, wherein said strip is folded over behind each of said microphones to provide double said thickness therebehind to minimize acoustic feedback.

* * * * *

UNITED STATES PATENT AND TRADEMARK OFFICE
CERTIFICATE OF CORRECTION

PATENT NO. : 4,584,436
DATED : April 22, 1986
INVENTOR(S) : Charles B. Boenning et al.

It is certified that error appears in the above-identified patent and that said Letters Patent is hereby corrected as shown below:

In the Grant Only, Column 2, lines 35, 36 and 37, should read -- to engage the sides 18 and 19, respectively, of a door 20. A viewing tube, comprised of a brass extension or tube 21, an exterior lens piece 22 having a flared outer end --.

Signed and Sealed this

Sixteenth Day of September 1986

[SEAL]

Attest:

DONALD J. QUIGG

Attesting Officer     Commissioner of Patents and Trademarks